United States Patent
Wagstaff et al.

(10) Patent No.: US 6,356,510 B1
(45) Date of Patent: Mar. 12, 2002

(54) PHASE FLUCTUATION ENHANCED ADAPTIVE PROCESSOR

(75) Inventors: Ronald A. Wagstaff, Slidell, LA (US); Jackson A. Mobbs, Gulfport, MS (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/498,348

(22) Filed: Feb. 4, 2000

(51) Int. Cl.$^7$ ................................................. H04B 1/06

(52) U.S. Cl. ....................................... 367/135; 367/901

(58) Field of Search ................................ 367/131, 135, 367/901

(56) References Cited

U.S. PATENT DOCUMENTS

| | | | |
|---|---|---|---|
| 4,228,531 A | 10/1980 | Bogert | 367/135 |
| 4,953,145 A | 8/1990 | Carlson | 367/138 |
| 4,992,998 A | 2/1991 | Woodward | 367/99 |
| 5,502,688 A | 3/1996 | Recchione | 367/131 |
| 5,566,134 A | 10/1996 | Dufault | 367/135 |
| 5,732,045 A | 3/1998 | Wagstaff | 367/135 |
| 5,886,951 A | 3/1999 | Wagstaff | 367/135 |
| 6,036,351 A | * 3/2000 | Wagstaff | 367/901 |
| 6,104,672 A | * 8/2000 | Wagstaff | 367/119 |

OTHER PUBLICATIONS

Ronald A. Wagstaff, Awsum: A Digital Filter for Achieving Increased Signal—to—Noise Ratio and Other Signal Processor Enhancements (U), U.S. Navy Journal of Underwater Acoustics, Apr. 1996, p 451–464, vol. 46, No. 2. (This is a classified document, which cannot be released to the public).

Ronald A. Wagstaff, Jacob George, A New Fluctuation Based Processor that Includes Phase Variations (U), U.S. Navy Journal of Underwater Acoustics, Apr. 1996, p 465–472, vol. 46, No. 2. (This is a classified document, which cannot be released to the public).

Ronald A. Wagstaff, WISPR Processing: The Key to Accessing A New Source of Signal to Noise Gain (U), U.S. Navy Journal of Underwater Acoustics, Oct. 1995, p 783–796, vol. 45, No. 4. (This is a classified document, which cannot be released to the public).

Ronald A. Wagstaff, Jacob George, WISPR Filter Performance Measured in the Presence of Signal Fluctuations and Ambient Noise (U), U.S. Navy Journal of Underwater Acoustics, Oct. 1995, p 797–806, vol. 45, No. 4. (This is a classified document, which cannot be released to the public).

Ronald A. Wagstaff, Karen J. Dudley, Trend Removal to Improve the Performance of the WISPR Processor for Detecting Submerged Sources (U), U.S. Navy Journal of Underwater Acoustics, Oct. 1995, p 813–820, vol. 45, No. 4.

Ronald A. Wagstaff, Jacob George, Enhanced Target Detection in the Dabob Bay Active Acoustic Barrier Using the WISPR Filter (U), U.S. Navy Journal of Underwater Acoustics, Oct. 1995, p 807–812, vol. 45, No. 4. (This is a classified document, which cannot be released to the public).

(List continued on next page.)

Primary Examiner—Ian J. Lobo
(74) Attorney, Agent, or Firm—John J. Karasek; Sally A. Ferrett

(57) ABSTRACT

A novel method and apparatus for signal processing are described which discriminate between signals and noise based on the magnitude of the phase fluctuations. In an embodiment of the invention, the governing equations of the process adaptively change in response to the phase and amplitude characteristics of the signals being received for processing. In an embodiment of the invention, an automatic detection method and apparatus is described which has the capability to alert an operator of the presence of signals having phase fluctuation characteristics which match a set of preset conditions (e.g. small fluctuations, medium fluctuations, or large fluctuations).

36 Claims, 8 Drawing Sheets

OTHER PUBLICATIONS

Ronald A. Wagstaff, Jackson A. Mobbs, ASWUM ESP: An Environmentally Sensitive Adaptive Fluctuation Based Processing Agorithm that Exploits Amplitude and Phase, presented at the 134$^{th}$ meeting of the Acoustic Society of America, Dec. 1997.

Ronald A. Wagstaff, Jacob George, Phase Variations in a Fluctuation Based Processor, SPIE Proceedings, Apr. 1996, p 132–141, vol. 2751.

Ronald A. Wagstaff, The AWSUM Filter: A 20 dB Gain Fluctuation Based Processor, IEEE Journal of Oceanic Engineering, Jan. 1997, p 110–118, vol. 22.

Ronald A. Wagstaff, Susan D. Gardner, Diet AWSUM: A Fluctuation Based Deconvolution Technique for Enhancing Signal to Noise Ratio and Resolution, IEEE Journal of Oceanic Engineering, Jan. 1997, p 119–127, vol. 22.

Ronald A. Wagstaff, Jacob George, The Effects of Variable Time Window Width and Signal Position Within FFT Bin on WISPR Performance, Naval Research Laboratory Report No. NRL/MR/7176–96–7717, Feb. 9, 1996.

Genevieve Jourdain, Valerie Carmillet, Pierre–Oliver Amblard, Acoustic Signal Processing—Detection of Phase or frequency—modulated signals in reverberation noise, The Journal of the Acoustical Society of America, Jun. 1999, vol. 105, No. 6, p 3375–3389.

Milica Stojanovic, Recent Advances in High–Speed Underwater Acoustic Communications, IEEE Journal of Oceanic Engineering, Apr. 1996, p 125–136, vol. 21, No. 2.

Milica Stojanovic, Josko A. Catipovic, John Proakis, Phase Coherent Digital Communications for Underwater Acoustic Channels, IEEE Journal of Oceanic Engineering, Jan. 1994, p 100–111, vol. 19, No. 1.

Peter N. Mikhalevsky, Alexander N. Gavrilov, Arthur B. Baggeroer, The Transarctic Propagation Experiment and Climate Monitoring in the Artic, IEEE Journal of Oceanic Engineering, Apr. 1999, p 183–201, vol. 24, No. 2.

* cited by examiner

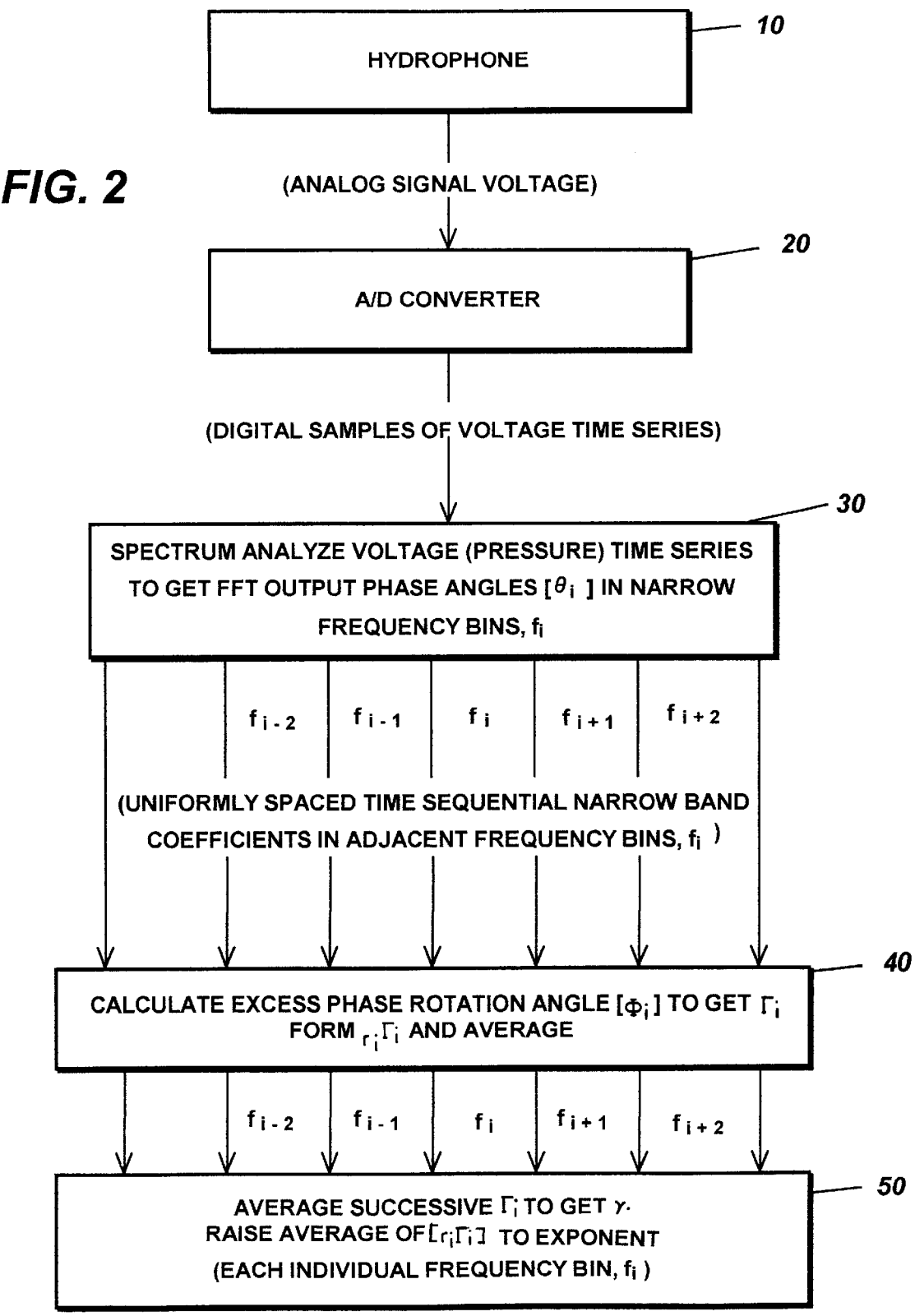

PHASE FLUCTUATION ENHANCED ADAPTIVE PROCESSOR

BACKGROUND OF THE INVENTION

The present invention relates to a signal processing technique for separating signals from noise, and more specifically to a signal processing technique which separates signals from noise according to the magnitude of the fluctuation in the phase angles.

In underwater acoustic systems, receivers receive a great number of input signals in the form of electrical impulses corresponding to pressure variations in the media. Fluctuations in amplitude and phase are inherent in data measured in many environments, including the undersea acoustic environment. In many cases, fluctuations will degrade processor performance. Current techniques to minimize the effect of fluctuations in amplitude and phase include power averaging for durations that are much longer than the fluctuation periods as well as carefully designing the measurement apparatus to reduce the influence of fluctuation generation mechanisms.

Sonar system performance can be influenced by fluctuations in the amplitude of the received signal as well as by noise from environmental sources. For example, the presence of phase fluctuations can reduce the acoustic detection range of a submarine by making it more difficult to discriminate between signals from the submarine's acoustic signature, clutter signals from ships, and the environmental noise. Current sonar system technology does not effectively discriminate between noise and signals, and fluctuations which degrade the signal processor's performance are considered a nuisance to be avoided if possible, or to be ignored if they cannot be avoided.

Some of the natural causes of amplitude fluctuations in underwater acoustics which are considered to be the most important, for periods of a few minutes or less, are thermal and salinity finestructure, internal waves, turbulent particle velocities, ray-path or wave-front reflection from the sea surface, temporally variable source-receiver range separation, temporal changes in modes or ray-paths caused by source or receiver vertical motion, source radiation amplitude instability, and multipath arrivals.

Most signal processing technology used to differentiate between signals and noise and clutter concentrates on filtering higher power level inputs (assumed to be signals) from lower power level inputs (assumed to be noise). However, this approach is effective only if the signal has a greater amplitude than the surrounding environmental noise. Signals with amplitudes approximately the same or less those that of the environment are extremely difficult to distinguish from noise.

A different approach relies on the phenomenon that noise has amplitude but no real phase, because it is not the result of a wave with a sinusoidal shape. A Fast Fourier Transform method can be used to spectrum analyze these electrical signals, which results in a set of complex vectors, each containing a magnitude and phase angle. For noise, the phase that a signal processor detects is an artifact of the Fourier Transform (FT) process. Because noise has no true phase, the Fourier Transform process assigns a random phase angle to each amplitude value. Therefore, the phase angles of successive FT realizations of the noise, being random will appear as random phase fluctuations and will not be trackable as they will be for sinusoidal signals. Some signals (e.g., from submerged acoustic sources) will have small phase fluctuations between successive samples. Some signals (e.g., from ships) will have medium phase fluctuations, and noise will have large phase fluctuations. In some applications, such as detection of submerged acoustic sources, it is desirable to eliminate the signals with medium and large phase fluctuations and the noise, retaining only the small phase fluctuation signals. In other applications, such as detection of surface acoustic sources (e.g., surface ships), it is desirable to eliminate only the small phase fluctuation signals, and retaining only the medium and large phase fluctuation signals.

One feature of most currently available signal processors, which are not based on phase fluctuations, is that their governing equations are fixed, and do not adaptively change in response to changes in the environment. When environmental conditions change, the amplitude and phase characteristics of the ambient noise and clutter signals (e.g. acoustic signals from ships) also change. A processor with fixed signal processing parameters may be effective in one set of environmental conditions, but less effective in processing data in a different set of environmental conditions. A signal processor which would adapt to the signal and ambient fluctuation conditions would be extremely valuable for signal measurements which must be made over a time period in which the environment changes.

Another characteristic of the current approaches which do not discriminate between small phase fluctuation (SPF) signals, medium phase fluctuation (MPF) signals, and large phase fluctuation (LPF) signals is that an operator must monitor the results of the processor in order to evaluate whether a signal of interest is present. This is time intensive and expensive. An unattended automated system which could discriminate among SPF signals, MPF signals, LPF signals, and LPF noise is needed to provide inexpensive monitoring for underwater acoustic and other signals. This automatic detection capability would free an operator to examine only the signals meeting specific criteria, rather than monitoring all incoming signals to determine whether they were of interest.

One technique for increasing the signal to noise ratio of sinusoidal signals in random noise using a phase fluctuation approach is found in Wagstaff et al U.S. patent application Ser. No. 09/320,697, allowed, which is incorporated herein in its entirety. Another technique is described in U.S. Pat. No. 5,732,045, Fluctuations Based Digital Signal Processor Including Phase Variations issued to Wagstaff et al on Mar. 24, 1998, which is incorporated herein in its entirety.

SUMMARY OF THE INVENTION

Accordingly, an object of the invention is to vary processor parameters to change the degree of SPF signal attenuation, MPF signal attenuation, and LPF clutter signal attenuation, noise attenuation, signal gain, and other processor characteristics based on the magnitude of the phase fluctuations of the received signals and noise.

Another object of the invention is to adaptively modify the governing equations of a signal processor to more modify the degree of attenuation of signals and noise as the magnitude of their phase fluctuations changes.

Another object of the invention is to provide a computationally efficient method and apparatus to more severely attenuate clutter signals and noise as their phase fluctuations increase.

Another object of the invention is to utilize the phase fluctuations to increase the signal to noise ratios of small phase fluctuation signals.

Another object of the invention is to make a narrowband processor robust to temporal trends in the amplitude of the data, and to temporal fluctuations in the amplitude of the data.

Another object of the invention is to improve the spectral resolution of a narrowband processor.

Another object of the invention is to improve the spatial resolution of a narrowband processor.

Another object of the invention is to suppress the narrowband clutter due to signals that have large phase fluctuations.

Another object of the invention is to detect in an unalerted and automatic manner signals that have smaller phase fluctuations than clutter and noise.

Another object of the invention is to detect in an unalerted and automatic manner signals that have medium or large phase fluctuations.

Another object of the invention is to eliminate the ambient noise in a received signal.

Another object of the invention is to eliminate clutter.

Another object of the invention is to provide a signal processor with parameters that can be adjusted to distinguish between small phase fluctuation signals, clutter signals, and noise.

Another object of the invention is to enhance the performance of a signal processor for signals that have small phase fluctuations.

Another object of the invention is to enhance the performance of a signal processor for signals that have large phase fluctuations.

Another object of the invention is to enhance the performance of a signal processor for signals that have medium phase fluctuations.

In accordance with these, and other objects made apparent hereinafter, the invention concerns a method and apparatus which filters an N point time series of complex data, each datum having a vector amplitude r and a phase angle θ, the ith members of the time series of complex numbers being denoted $r_i$ and $θ_i$, where i=1, 2, ..., N. An estimate of the magnitude of the phase fluctuation $Φ_i$ is determined for each ith sample. A term $Γ_i$, is calculated as $Γ_i=F(Φ_i)$, wherein $F(Φ_i)$ is a preselected function of $Φ_i$, and the term γ is calculated as sum of $Γ_i$ over the time series multiplied by a constant. A calculation of AWSUM ESP is made such that the each $r_i$ term is raised to the exponent $Γ_i$, and the $r_i^{Γi}$ terms are summed over the time series. The summation is then divided by a scaling factor, and the result is raised to the exponent γ.

In one embodiment of the invention, ASWUM ESP is calculated $$AWSUM\ ESP = \left[\frac{1}{SF2}\sum_{i=3}^{N} r_i^{Γi}\right]^γ,$$

where SF2 is a scaling factor. This allows differentiation of small phase fluctuation signals from large phase fluctuation signals based on the value of AWSUM ESP, the AWSUM ESP value being large for signals with small phase fluctuation (SPF) and small for large phase fluctuation (LPF) signals, which are typically clutter signals and noise. If $F(Φ_i)$ is a quadratic equation in $Φ_i$, the value of AWSUM ESP could be large for MPF signals and small for SPF signals, LPF signals, and noise. Additionally, an automatic detection capability is based on calculation of ESP, which divides the incoherent average by the AWSUM ESP value. A small ESP will indicate a SPF signal, while a large ESP value will indicate a LPF signal. Other alternative methods can be used, such as the smallness of the standard deviation of the angles Φ, which is small for SPF signals, and large for LPF signals and noise.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 2 is a functional block diagram showing steps for practicing the invention.

DETAILED DESCRIPTION

A processor is developed which receives time series of complex vector quantities in from a spectrum analyzer, and selectively attenuates or amplifies the received complex vector quantities based on the phase fluctuation of the signal, by attenuating the signals having large phase fluctuations and enhancing phase stable signals. The processor adaptively changes its signal processing parameters depending on the magnitude of the phase fluctuations of the received signals.

A phase fluctuation based signal processor can also be designed to enhance the SNR of an existing signal processor which is based on the signal amplitude, fluctuation of the signal amplitude, or other signal characteristic.

This may be better understood by a discussion of the theoretical basis for the processor.

Figure 1:
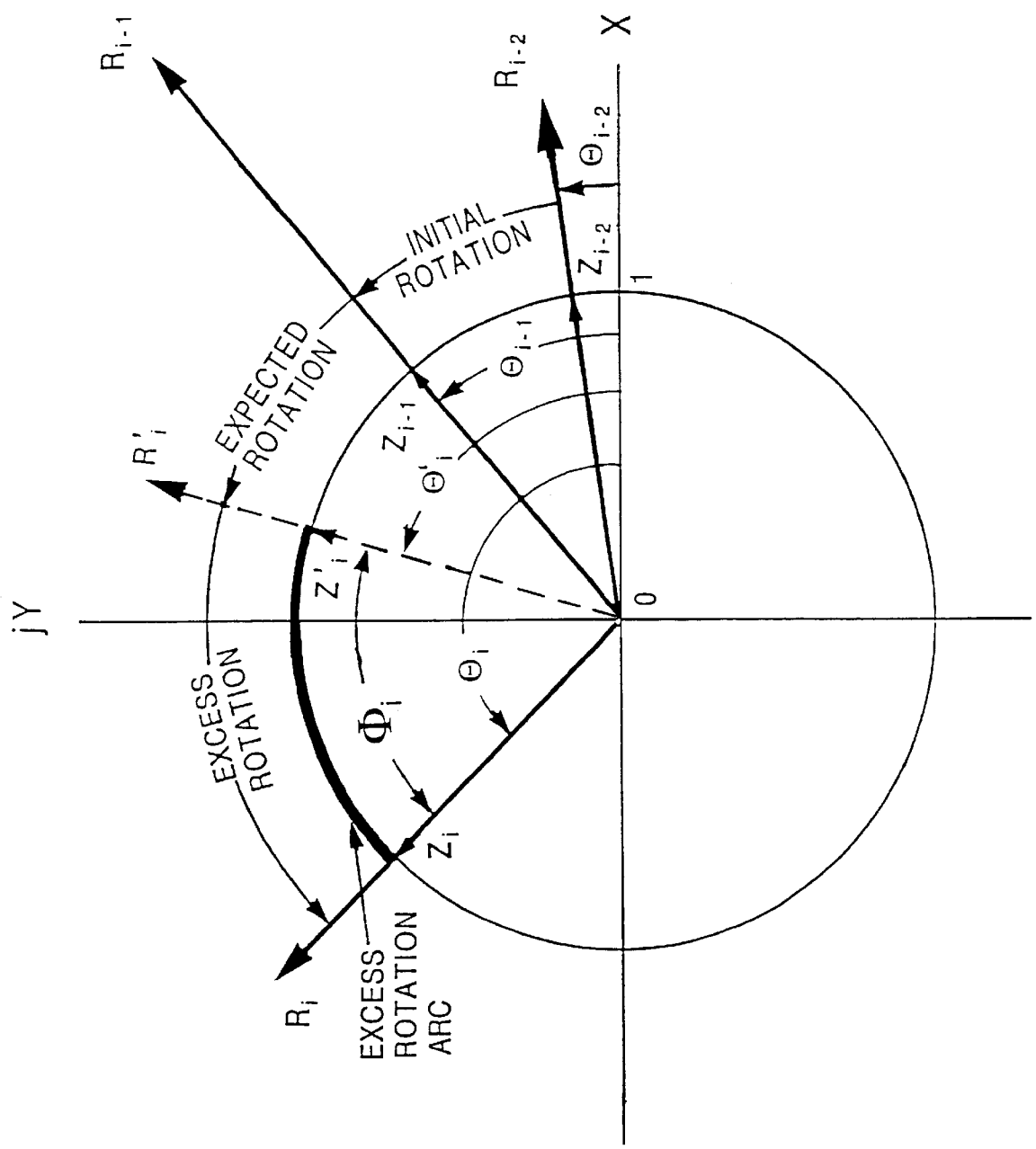
FIG. 1 is a polar coordinate diagram illustrating the phase relationship between consecutive samples of a complex vector quantity $R_{i-2}R_{i-1}$, and $R_i$.

The polar coordinate diagram of FIG. 1 illustrates the phase relationship between consecutive samples of a complex vector quantity $R_{i-2}$, and $R_i$.

Let $$R_i = r_i e^{j\theta_i} = r_i \cos\theta_i + j r_i \sin\theta_i = r_i Z_i, \quad \text{Equation (1)}$$

where $Z_i$ is the i th unit phasor. These vectors and their corresponding phase angles $\theta_{i-2}$, $\theta_{i-1}$, and $\theta_i$ can be used to phase align the vectors.

The method and apparatus described herein rely on the expectation that for uniformly sampled data, the phase rotation of an i-2 th vector, will have a uniform progression as it rotates to the next two sample positions, i-1 and i. If the rotation rate is constant, the difference between the first two phase angles, $\theta_{i-2} - \theta_{i-1}$, should be equal to the difference between the second two phase angles, $\theta_{i-1} - \theta_i$. The expected phase angle of the i th vector, $\theta'_i$ will be equal to the second phase angle, $\theta_{i-1}$, plus the difference between the first and second phase angles, $\theta_{i-2} - \theta_{i-1}$.

If the rotation rate is not constant, the fluctuation in the phase angle $\theta_i$ of the vector $R_i$ will result in an excess phase rotation, $\Phi_i$, which is equal to $\theta_i - \theta'_i$, the amount that the actual phase angle $\theta_i$ exceeds the expected phase angle $\theta'_i$. The excess phase rotation angle $\Phi_i$ is the angle by which the vector $R_i$ is out of perfect phase alignment with the previous two vectors $R_{i-2}$ and $R_{i-1}$. The value of $\Phi_i$ is optimally described as a radian value between $-\pi$ and $+\pi$.

Various forms of phase fluctuation-based signal processors can be developed based on the set of excess phase rotation angles $\{\Phi\}$.

One way to calculate $\Phi i$ is by the following equation:

$$\Phi_i = \theta_i - \theta'_i = \theta_i - 2\theta_{i-1} + \theta_{i-2} \quad \text{Equation (2)}$$

Although $\Phi_i$, the excess phase rotation angle, is here calculated as $\theta_i - 2\theta_{i-1} + \theta_{i-2}$, there are many other ways to calculate $\Phi_i$. For example, $\Phi_i$ may be calculated through a phase locked loop approach. Alternatively, $\Phi_i$ may be calculated by an iterative process for choosing an optimal phase angle, as described in Phase Variations in a Fluctuation Based Processor, Ronald A. Wagstaff and Jacob George, SPFE Vol. 2751, April 1996, pages 132–141, and in U.S. Pat. No. 5,732,045, both incorporated herein in their entirety.

Alternatively, as long as the phase among a series members is maintained, this method and apparatus may be applied to any time series of any estimate of the magnitude of phase fluctuations. A review of this disclosure will make it obvious to one of ordinary skill in the art that another measurement of phase fluctuation may be used in place of the excess phase rotation angle, $\Phi_i$, in the invention described herein. In addition to being calculated by a method such as discussed above, the estimate of phase fluctuation may also be received from another source, such as an intermediate signal processing device.

For a set of data vectors $\{R_i\}$, the incoherent average (an average taken without phase aligning the vectors) of their magnitudes is designated AVGPR. For a set of vectors $\{R_i\}$, if the first two vectors $R_1$ and $R_2$ are used to define the starting phase angles, AVGPR is defined for the remaining data vectors at i=3 to N.

The incoherent average AVGPR may be defined using a power-law processor equation as $$AVGPR = \frac{1}{SF3} \sum_{i=3}^{N} r_i^K \quad \text{Equation (3)}$$

where $r_i$=the magnitude of the vector $R_i$, K=2, and SF3 is a scaling factor. The scaling factor SF3 is preferably equal to N–2, which is the number of terms being summed, and is convenient for normalizing the summation term, so that the summation will be of the same order and in the same units as the terms being summed. Although N–2 is convenient, many other values for the scaling factor SF3 may also be used.

A more general form of the power law equation allows K to be any real number. The power law processor with a value of K of 2.4 is considered to be the optimum processor for a sinusoidal signal in Gaussian white noise, as discussed in "Performance of Power-Law Processor with Normalization for Random Signals of Unknown Structure," A. H. Nuttall, NUWC-NPT Technical Report 10,760, May 1997. Since these optimal conditions do not occur often in real measurement situations, another value of K can be selected, which is appropriate for the conditions.

A Environmentally Sensitive Phase Fluctuation Based Processor

In one embodiment of the invention, a processor can be developed which attenuates noise and clutter signals, based on the magnitude of the excess phase rotation angle. Two measurements of phase fluctuations ($\Gamma_i$, $\gamma$) are convenient for characterizing the phase stability of a signal.

First, $\Gamma_i$ is defined as $$\Gamma_i = F(\Phi_i), \text{ where } F(\Phi_i) \text{ is a general function of } \Phi_i. \quad \text{Equation (4)}$$

For underwater acoustical data, a useful form of F ($\Phi_i$) is $$F(\Phi_i) = C + D \, \Phi_i^E, \quad \text{Equation (5)}$$

where C, D, and E are constants that depend on processing parameters such as frequency resolution and overlap of the successive Fast Fourier Transforms (FFT) and the type of data (such as acoustic, electromagnetic, optical). For example, for underwater acoustic data with FFT overlap of 75%, typical values are about C=2.53, D=–134.74, and E=8. If the variable used is the square of the pressure amplitude rather than the pressure amplitude, typical variables are C=8, D=–51.2 and E=–8.

One procedure for assigning values to parameters C, D, and E is to process complex number data, which is known to correspond to particular signals, clutter, and noise. The values of C, D, and E, along with threshold values discussed later, are varied until there is effective discrimination between the signals of interest and other signals and noise. The values of C, D, E, and threshold values discussed herein were determined in this empirical manner.

Depending on the values selected for parameters C, D, and E, the value of $\Gamma_i = F(\Phi_i)$ will be negative when the excess phase rotation angle $\Phi_i$ is large, which would correspond to noise. For signals with small phase fluctuations, the value of $\Gamma_i = F(\Phi_i)$ will be positive.

Note that for other types of data, $F(\Phi_i)$ may take a different form than that in Equation (5) (e.g. polynomial or non linear).

Next, γ is defined as $$\gamma = \frac{1}{SF1} \sum_{i=3}^{N} \Gamma_i,$$ Equation (6)

The scaling factor SF1 is preferably equal to N−2, which is the number of terms being summed, is convenient for normalizing the summation term, so that the summation will be of the same order and in the same units as the terms being summed. Although N−2 is convenient, many other values for the scaling factor SF1 may also be used.

In addition, the values of $\Gamma_i$ and γ which result will depend on the data type (acoustical, optical, electrical, etc.) and processing parameters. In the case of underwater acoustical data, typical ranges are $1 \geq \gamma \geq -8$ and $2 \geq \Gamma_i \geq -8$. If the variable used is the square of the pressure amplitude rather than the pressure amplitude, then typical ranges are $1 \geq \gamma \geq -8$ and $1 \geq \Gamma_i \geq -8$.

A processor which is sensitive to environmental changes can be developed based on the following definition of AWSUM ESP:

$$AWSUM\ ESP = \left[ \frac{1}{SF2} \sum_{i=3}^{N} r_i^{\Gamma i} \right]^{\gamma}$$ Equation (7)

where SF2 is a scaling factor. As discussed above, the scaling factor may be selected to be equal to N−2, which is convenient for normalizing the summation term, so that the summation will be of the same order and in the same units as the terms being summed. Although N−2 is convenient, many other values for the scaling factor may also be used in Equation (7) above to normalize the summation term.

Equation (7) may be applied to any time series of complex numbers having a vector amplitude $r_i$ and a phase angle $\theta_i$. For underwater acoustics, the processor may use the pressure amplitude as the $r_i$ variable. Alternatively, the acoustic power, which is proportional to the square of the pressure amplitude, may be substituted for the pressure amplitude as a variable. Looking first at the $r_i^{\Gamma i}$ term, when the exponent $\Gamma_i$ is negative (corresponding to noise or clutter), the $r_i^{\Gamma i}$ term has a value that is less than or equal to one. When the exponent $\Gamma_i$ is positive (for small phase fluctuations signals), $r_i^{\Gamma i}$ will be much greater than one for magnitude constrained data (e.g. on the order of 50000 units relative to one micro-Pascal).

When the $r_i^{\Gamma i}$ terms are summed over i=3 to N in Equation (7), $r_i^{\Gamma i}$ values which have small excess phase angle rotation angles will dominate the summation. This results in terms that are characteristic of true signals dominating the summation, while terms characteristic of noise will be attenuated.

Occasionally, however, some small fluctuations of the clutter signals and noise will survive in the summation of Equation (7) to give a reduced contribution to those bins. These survivors have a large negative average of the $\Gamma_i$ values, and therefore, Equation (7) will have a negative γ exponent. The negative γ exponent inverts the summation in Equation (7), which effectively eliminates any surviving noise or clutter signals.

An input signal with small phase fluctuations will have an average γ which is positive, and will not invert the summation in Equation (7) above. Therefore, signals with a small phase fluctuation will contribute significantly to the AWSUM ESP result, while clutter signals and noise will be attenuated to nearly zero.

Thus, as the phase fluctuations due to ambient noise or clutter in the environment increase or decrease, the exponents $\Gamma_i$ and γ change, adapting Equation (7) to the data being processed. This technique results in an extremely large output signal-to-noise ratio (SNR) for small phase fluctuation (SPF) signals.

A process for determining the AWSUM ESP as described above can include the following steps: sampling the time domain data, converting the sampled time domain data from an analog to a digital format, spectrum analyzing the data to produce the complex vector quantities R ($r_i$ and $\theta_i$) in narrow frequency bins, calculating $\Gamma_i$ as a function of $\Phi_i$, raising the quantity $r_i$ to the power of $\Gamma_1$, calculating γ as a number proportional to the summation of $\Gamma_i$ over the time series, summing $r_i^{\Gamma i}$ over the time series, multiplying the summation of $r_i^{\Gamma i}$ by a normalization factor, and raising the result to the power of γ.

Automatic detection of Phase Stable Signals

It is desirable to be able to easily and automatically identify signals that have small enough phase fluctuations to be characteristic of phase stable signals. For example, in underwater acoustic data, input signals from a submerged acoustic projector have a highly stable phase rotation, compared to clutter signals and noise. It is extremely useful to be able to automatically detect submerged acoustic sources for further processing or examination.

If ESP is defined as $$ESP = \frac{AVGPR}{AWSUM\ ESP}$$ Equation (8)

then the value of ESP will be small for input signals with small phase fluctuations, and will be large for clutter and noise signals. Based on this principle, an automatic detector/signal processor can be developed which will indicate that an input signal with small phase fluctuation is detected, when the value of ESP is less than a preselected threshold value. For underwater acoustic signals, a typical threshold value is $$ESP \leq 3.16$$ . Equation (9)

In this example, an ESP value that is less than 3.16 (5 dB) would indicate that a signal having small phase fluctuations (e.g. one from a submerged acoustic source) is present.

A Fluctuation Based Process for Identifying Phase Stable Signals

FIG. 2 shows an example of a method and apparatus for identifying small phase fluctuation acoustic signals in an underwater environment. Time domain data are received from a hydrophone 10, which has converted the measured pressure to analog signal voltage. An Analog to Digital converter 20 converts the input analog signal voltage to digital samples of the voltage time series. A spectrum analyzer 30 analyzes the digital voltage time series and produces phase angles ($\theta_i$) in frequency bins, $f_i$. Next, the excess phase rotation is calculated, and the values of $\Gamma_i$, $r_i^{\Gamma i}$, and the average of the $r_i^{\Gamma i}$ values are calculated, 40. Next, successive $\Gamma_i$ values are averaged to determine γ, and the average of the $r_i^{\Gamma i}$ values is raised to the power γ.

Although a hydrophone is shown as the data source in FIG. 2, this method and apparatus may also be used to process other types of input signals from other types of sensors or data receivers, such as, for example, infrared detectors, optical receivers, or electrical field sensors.

Figure 3A:
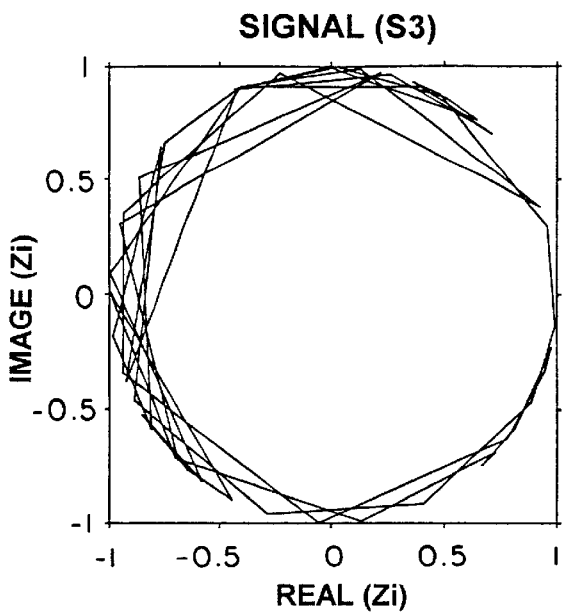
FIGS. 3a and 3b show Argand diagrams of different acoustic signal types.
Figure 3B:
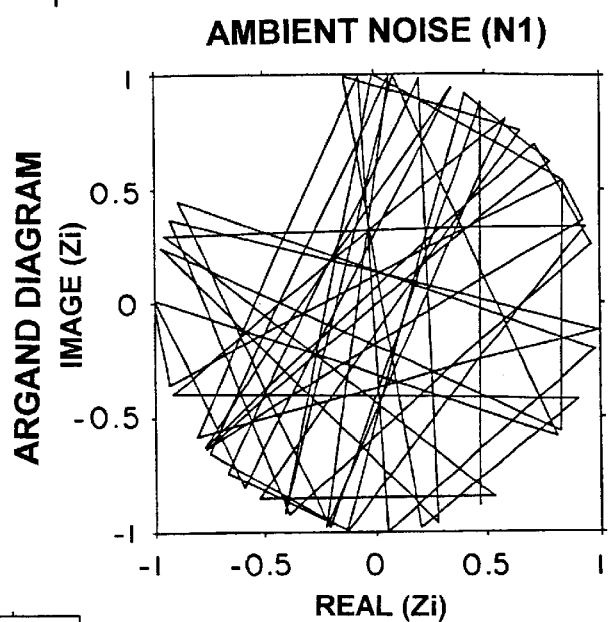
Figure 3C:
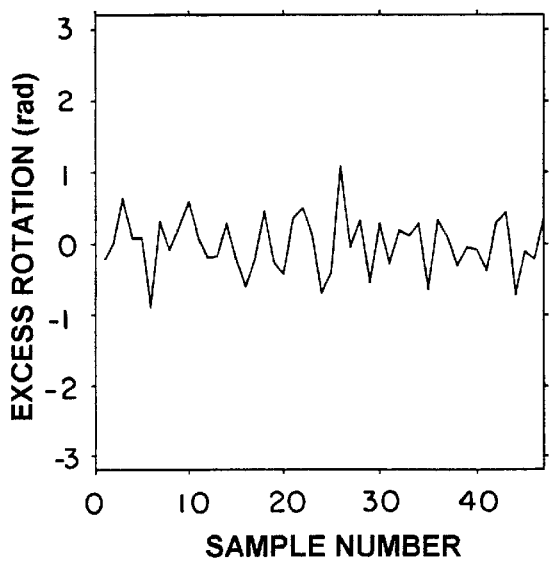
FIGS. 3c and 3d show excess phase rotation plots.
Figure 3D:
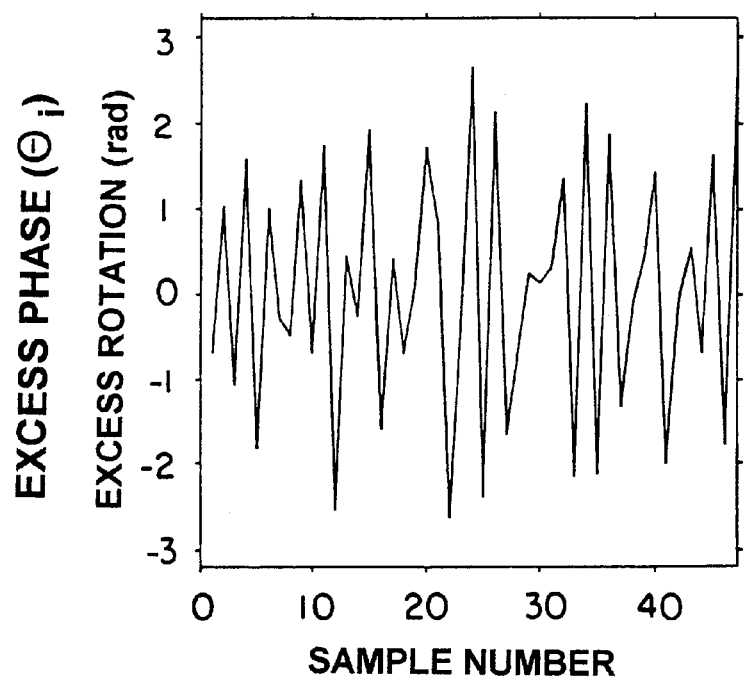
Figure 3E:
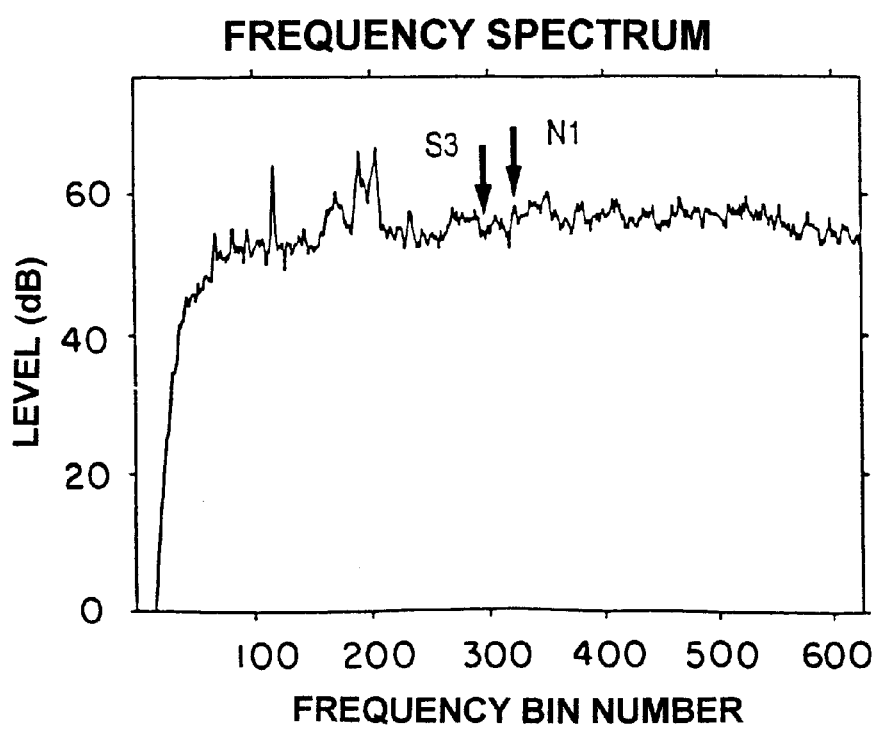
FIG. 3e shows the frequency spectrum of the input signal and noise corresponding to the excess phase rotation plots of FIGS. 3c through 3d.

FIGS. 3a through 3e show the results of applying this process to underwater acoustic data. FIG. 3e shows frequency spectra for the complex unit pressures measured by a hydrophone, after spectrum analysis has been accomplished. The different phase relationships for small excess phase rotation angle signals and noise can be illustrated by comparing an Argand diagram of a small excess phase rotation angle signal with an Argand diagram of noise. Argand diagrams are formed by plotting the real versus the imaginary components of complex numbers ($Z_i$ in FIG. 1) and connecting the consecutive points to form straight lines between consecutive samples. FIGS. 3a and 3b are Argand diagrams for complex time histories of spectrum analysis (such as Fast Fourier Transform) outputs for the signal S3 and the noise N1 in frequency bins 296 and 322, respectively, of the FIG. 3e frequency spectrum. In FIG. 3a, the lines between consecutive samples are concentrated near the boundaries of the plot, suggesting a degree of non-random behavior. In FIG. 3b, however, the lines between consecutive samples appear to be randomly distributed over the surface of the Argand diagram, as would be expected for noise.

FIGS. 3c and 3d plot the excess phase rotation angle, $\Phi_j$, for the SPF signal S3 and for a noise NI, respectively. In this case, the sequence of excess phase rotation angles for a SPF signal S3 generally lie between plus and minus one radian, while the sequence of excess phase rotation angles for the noise Ni extends well beyond the corresponding radian range of the signal. Such large excess phase rotation excursions are typical of noise, due to the random phase angles assigned by the FFT. A typical trace for signal, particularly for modest signal excess (e.g. 5 dB), could be expected to have a trace with smaller excursions of excess phase rotation angle than those shown in FIG. 3c. The AWSUM ESP increases the resolution, increases the SNR, and can provide an unalerted automatic detection capability by exploiting the difference between the excess phase rotation angle excursions for SPF signal and the excursions for LPF clutter and noise.

The SPF signal enhancement and the LPF clutter signal and noise suppression capabilities of the AWSUM ESP processor can be further understood by considering FIGS. 4 through 7 for a particular example.

Example of an Environmentally Sensitive Phase Fluctuation Based Processor Applied to Underwater Acoustic Data Underwater acoustic data were taken during a measurement exercise approximately 50–100 miles south of Oahu, HI. The bottom depth of the oceanic region was between 3000 and 6000 meters. Two deep acoustic sources were present in the region at ranges from the array of 50 to 85 nautical miles. A surface ship towed a line array of 144 uniformly spaced hydrophone receivers at a depth of approximately 700 meters. Following the data collection, an AWSUM ESP processor with constants of C=8, D=−51.2, and E=8 was applied to the data.

Figure 4A:
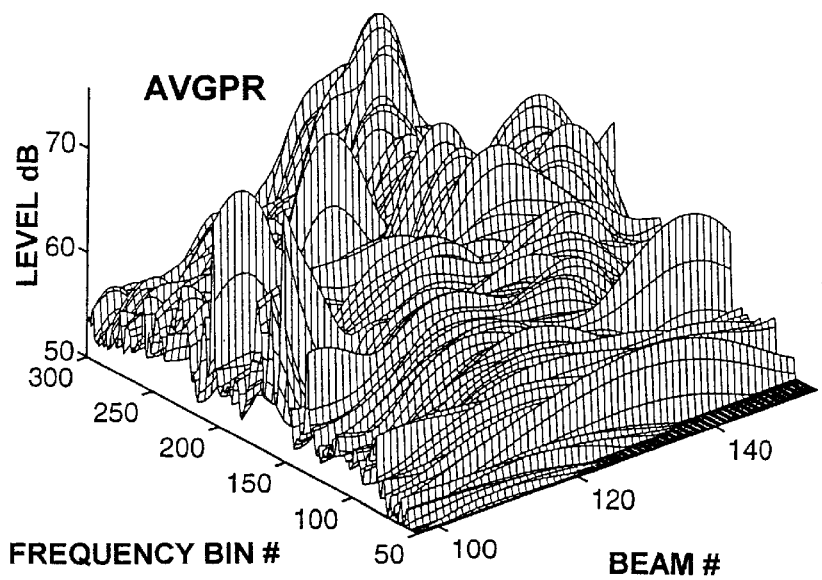
FIG. 4a shows power level of the AVGPR value versus frequency bin number and beam number for frequency bins 50 to 300 and beam numbers 95 to 155.

FIG. 4a is a plot of the AVGPR from Equation (3) versus the frequency bin number and beam number. Most of the surface in FIG. 4a is due to noise and LPF signal clutter present in the undersea environment. The noise and clutter masks the two submerged acoustic signal sources known to be present in the test area at that time.

Figure 4B:
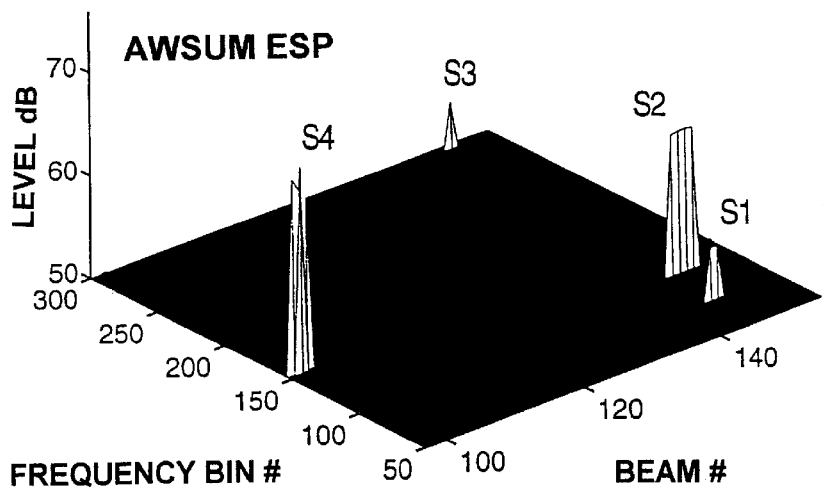
FIG. 4b shows power level of the AWSUM ESP value versus frequency bin number and beam number for frequency bins 50 to 300 and beam numbers 95 to 155.

FIG. 4b shows the result of applying an AWSUM ESP processor using Equations (4) through (7) to the same test data used for the AVGPR measurement in FIG. 4a. As a result, only four signals (indicated as S1, S2, S3, and S4) have a sufficiently small phase fluctuation to survive the AWSUM ESP filtering process. In both FIGS. 4a and 4b, only results above the 50 dB level are displayed, as this is the region of interest.

Figure 4C:
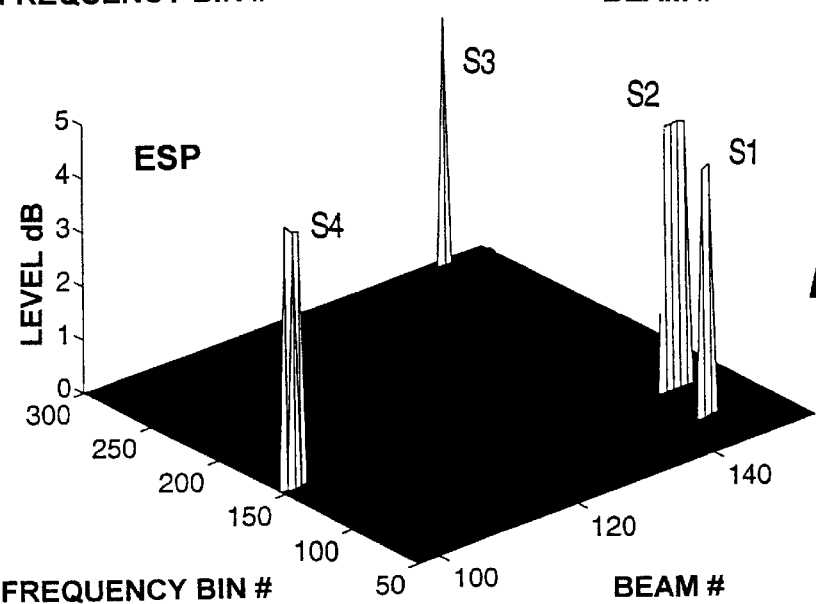
FIG. 4c shows the power level of the value of AWSUM ESP divided by the value of AVGPR (i.e. ESP value) versus frequency bin number and beam number for frequency bins 50 to 300 and beam numbers 95 to 155.

FIG. 4c shows the result of applying Equation (8) to the test data used in FIG. 4a and 4b. For each cell (frequency bin and beam number), the ESP value is obtained by dividing the AVGPR power value plotted in FIG. 4a by the AWSUM ESP power value plotted in FIG. 4b. An alternative is to subtract the log value of the ASWUM ESP from the log value of the AVGPR. Only ESP values which are less than or equal to the threshold value are plotted. In this example, the ESP threshold value was chosen as 3.16 (5 dB). The plotted points in FIG. 4c correspond to signals having phase fluctuations less than the threshold, and indicate the presence of a submerged acoustic Source.

Figure 5A:
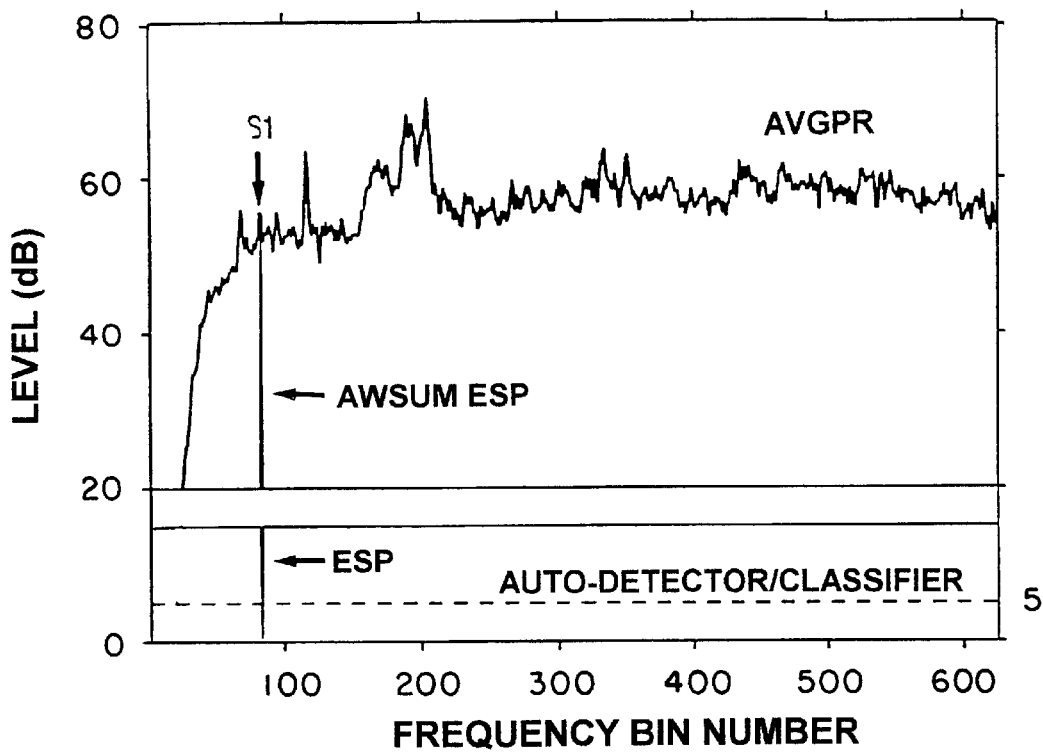
FIG. 5a illustrates power level versus frequency bin number, showing curves for the incoherent average of the signal magnitude AVGPR, AWSUM ESP, and ESP corresponding to point S1 on FIGS. 4b and 4c.
Figure 5B:
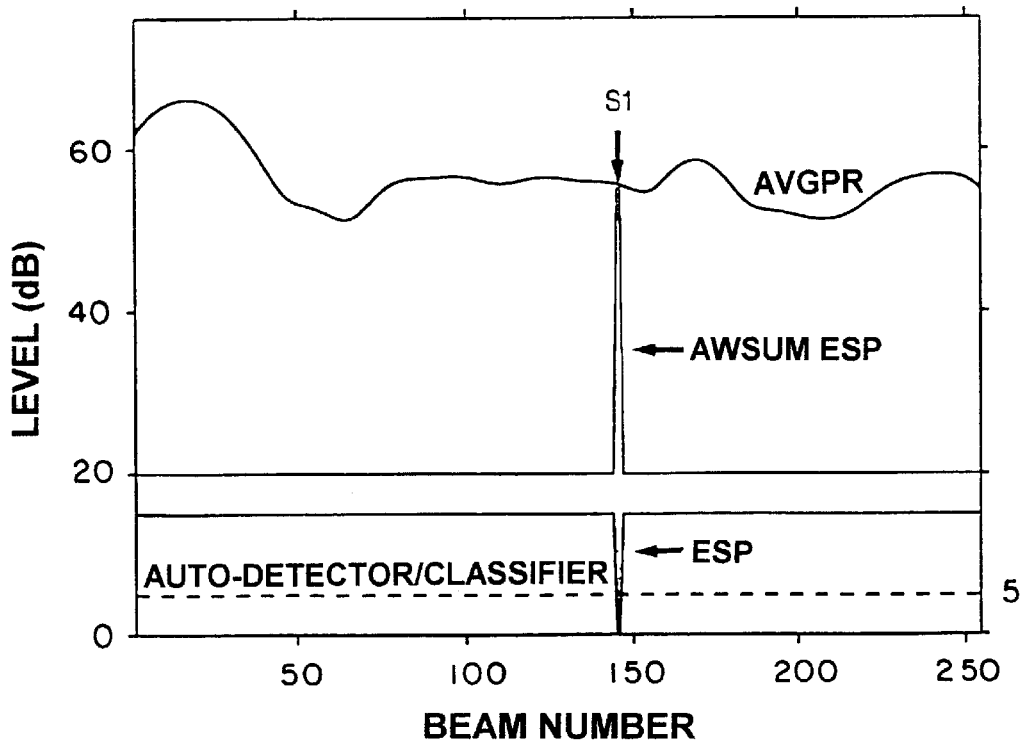
FIG. 5b is a plot of AVGPR, AWSUM ESP, and ESP power level versus beam number corresponding to point S1 in FIGS. 4b and 4c.

A better perspective of the performance of the AWSUM ESP process can be gained by reviewing FIGS. 5a and 5b. FIG. 5a is a frequency slice of the AVGPR, AWSUM ESP, and ESP plots of FIGS. 4a, 4b, and 4c at beam number 145, a beam number at which signal S1 was detected. The top curve shows the AVGPR result, which has been truncated at 20 dB for display purposes. The AWSUM ESP result for beam number 145 is a solitary spike at frequency bin number 83. The AWSUM ESP result is close to zero for all other frequency bins except 83, the one containing signal S1. The LPF clutter and noise apparent in the AVGPR plot have been attenuated to nearly zero by the AWSUM ESP process.

The bottom curve of FIG. 5a shows the ESP result for beam number 145. This plot has been truncated at 15 dB for display purposes, as the area below 15 dB is of most interest. The ESP results for all frequency bins except 83 are above 15 dB. The downward spike at frequency bin number 83 indicates the presence of a signal with small phase fluctuations. As the lower end of the downward spike approaches 0 dB, the confidence that a SPF signal (e.g. a submerged acoustic presence) is responsible for the spike increases. Sensitivity of this automatic SPF signal detector can be modified by selecting a different threshold ESP value, here 3.16 (5 dB).

FIG. 5b shows the beam number plot for the AVGPR, AWSUM ESP, and ESP curves for frequency bin number 83, which corresponds to the location of S1 in FIGS. 4b and 4c. This plot illustrates another advantages of the AWSUM ESP and ESP processes, in that they reduce the uncertainty in the spatial (beam number) location of the S1 signal. The effective spatial response of the AWSUM ESP and ESP results for S1 are approximately two beam separations wide, while the corresponding AVGPR 3 dB beam width is approximately 25 beam separations. The effective beam response width is reduced by a factor of approximately 12 reduction.

In FIGS. 5a and 5b the small phase fluctuation signal S1 is easily identified in the AWSUM ESP and ESP curves compared to the AVGPR curve. The AVGPR curve alone, in FIG. 5b, gives no indication of the presence of a SPF signal. A detector based only on AVGPR alone would not be able to distinguish the S1 signal or other signals with an AVGPR below a preset minimum detectable level (MDL).

Figure 6A:
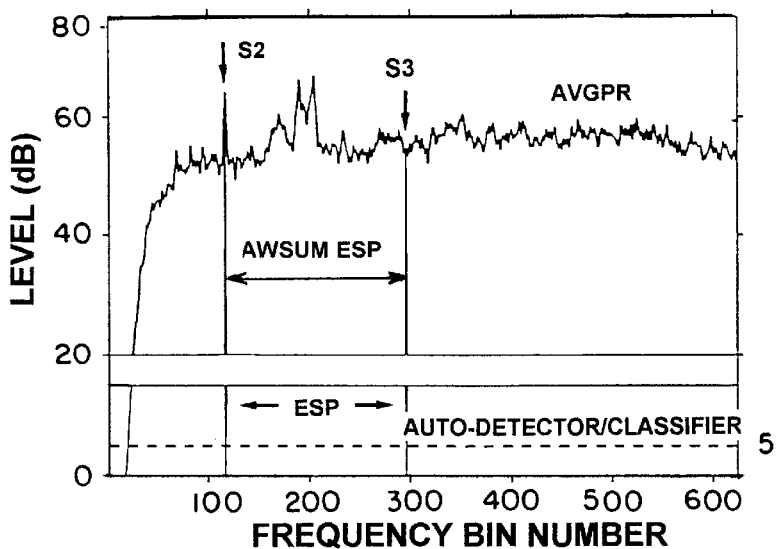
FIG. 6a is a plot of AVGPR, AWSUM ESP, and ESP power levels versus frequency bin number, at a frequency at which S2 and S3 appear in FIGS. 4b and 4c.

FIG. 6a provides further information about the AWSUM ESP and ESP capabilities. FIG. 6a presents a frequency slice on beam number 149, in which both S2 and S3 appear. Only the two SPF signals, S2 and S3, in frequency bins 117 and 296 respectively, survive the AWSUM ESP attenuation process and will be detected by an ESP detector. Again, all LPF clutter and noise are attenuated to nearly zero by the AWSUM ESP and ESP equations.

Figure 6B:
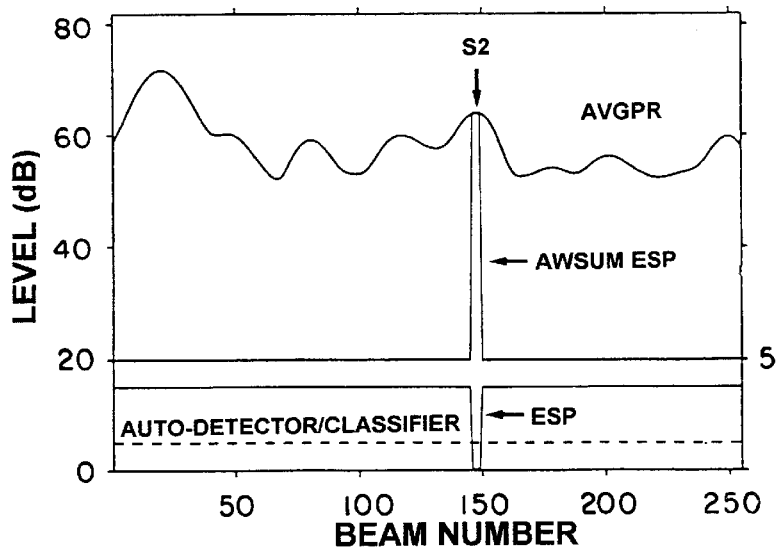
FIG. 6b is a plot of AVGPR, AWSUM ESP, and ESP power levels versus beam number at a frequency bin corresponding to point S2 in FIGS. 4b and 4c.

FIG. 6b presents a beam slice at the frequency bin 117, where signal S2 is present. Signal S2 has a high signal to noise ratio in both the frequency domain (FIG. 6a) and the spatial domain (FIG. 6b).

Figure 6C:
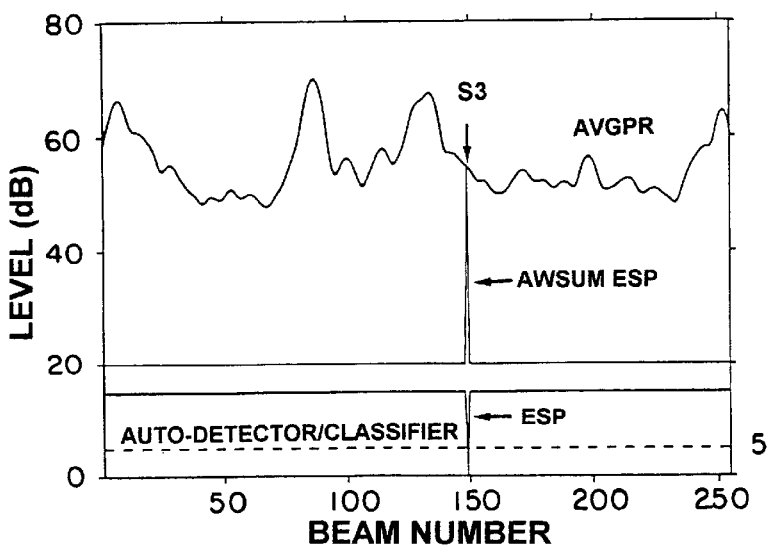
FIG. 6c is a plot of AVGPR, AWSUM ESP, and ESP power levels versus beam number at a frequency bin corresponding to point S3 in FIGS. 4b and 4c.

FIG. 6c presents a beam slice at the frequency bin 296, where signal S3 is present. Note that the amplitude of AVGPR at S3 does not indicate the presence of a submerged acoustic source, however, the dramatic AWSUM ESP processor response is strongly indicative of a small phase fluctuation signal at beam number 149. Additionally, the narrowness of the AWSIUM ESP and ESP spikes at S3 show a high degree of spatial resolution, with resolution to a single beam number cell for S3 in FIG. 6c. Similarly, FIG. 6a demonstrates the high spatial resolution of AWSUM ESP and ESP for frequency bin number, as the response is within one frequency bin number cell width. This reduction in beam width of approximately 7 over the beam width of the AVGPR response at S3 is due to the enhanced signal to noise ratio of the AWSUM ESP and ESP results for the small phase fluctuation signal S3.

Figure 7A:
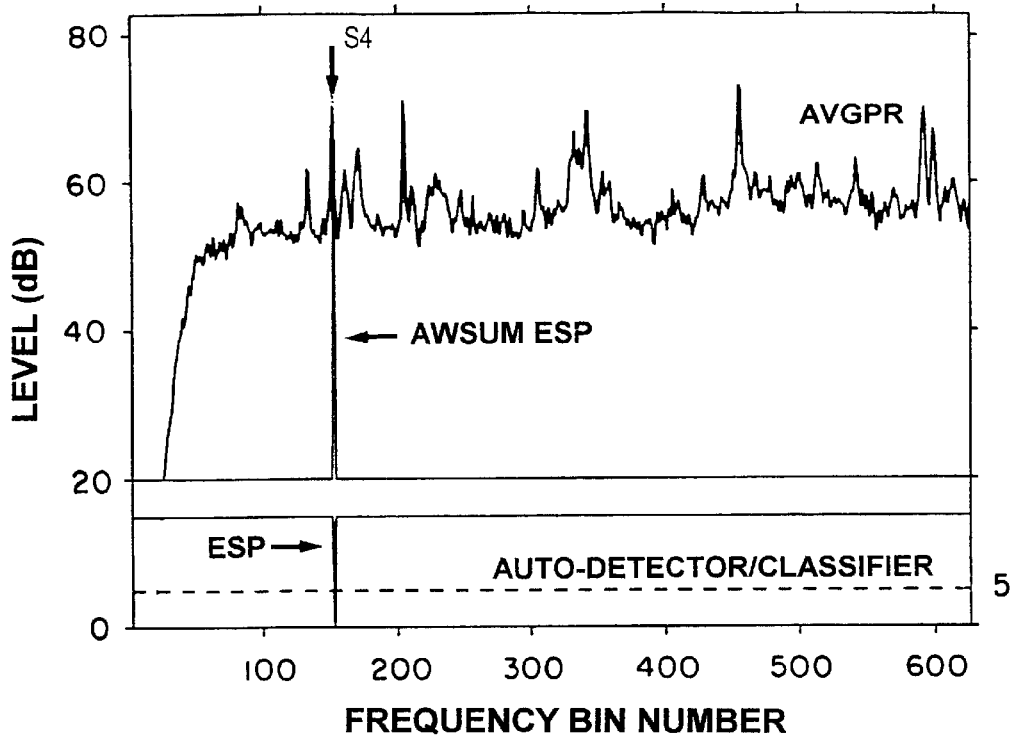
FIG. 7a is a plot of AVGPR, AWSUM ESP, and ESP power levels versus frequency bin number at a beam number corresponding to point S4 in FIGS. 4b and 4c.
Figure 7B:
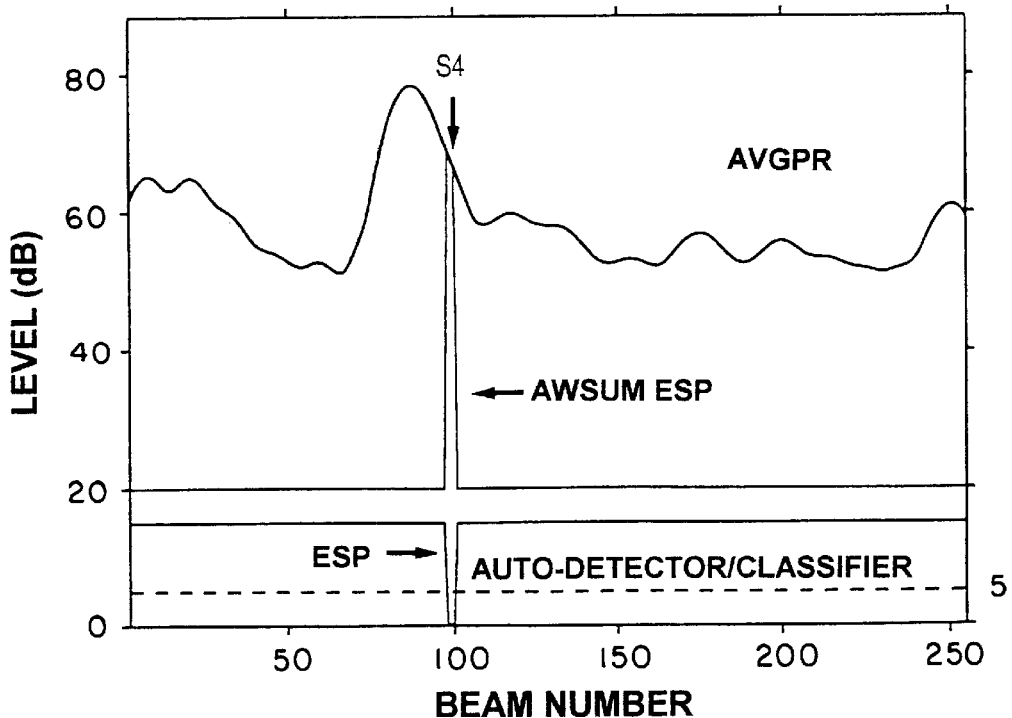
FIG. 7b is a plot of AVGPR, AWSUM ESP, and ESP power levels versus beam number at a frequency bin corresponding to point S4 in FIGS. 4b and 4c.

FIG. 7a and FIG. 7b provide the AVGPR, AWSUM ESP, and ESP results for the 99 SPF signal S4, in a similar manner as shown in FIGS. 6a, 6b, and 6c. Again, the AVGPR does not provide a clear indication of the presence of a SPF signal in the spatial (beam number) domain, but AWSUM ESP and ESP strongly suggest a SPF signal at S4. As in FIG. 6a, the two phase fluctuation based processors AWSUM ESP and ESP have about a three fold improvement in the effective spatial resolution over the AVGPR results.

One can apply the above methods and apparatus to any time series of complex numbers having a real and quadrature component, as long as the phase component of the complex number is maintained in sequence. Thus one could apply these methods and apparatus to unprocessed complex number data, or to data which has undergone some preliminary processing.

The invention has been described in what is considered to be the most practical and preferred embodiments. It is recognized, however, that obvious modifications to these embodiments may occur to those with skill in this art. According, the scope of the invention is to be discerned from reference to the appended claim, wherein:

What is claimed is:

1. A method for processing a signal, wherein the signal is representative of a characteristic of a physical medium, comprising the steps of:
   receiving a set of complex data for i=1 to N,
      wherein N=the total number of data in the set,
   each datum of the set having a vector amplitude $r_i$ and phase angle $\theta_i$, representative of a rotation rate which, if constant, yields an expected phase angle $\theta'_i$ of a ith vector equals to second phase angle, $\theta_{i-1}$ plus the difference between the first and second phase angles,
      determining $\Phi_i$, wherein $\Phi_i$ is an estimate having a predetermined value representative of a constant rotational rate of the magnitude of phase fluctuation of the ith vector, and calculating a phase fluctuation, $\Gamma_i$, wherein $\Gamma_i=F(\Phi_i)$ and $F(\Phi_i)$ and $F(\Phi_i)$ is a preselected function of $\Phi_i$.

2. The method as in claim, wherein the predetermined value of said $\Phi_i$ equals an excessive phase rotation angle representative of a non-constant rotational rate, and wherein the step determining $\Phi_i$ comprises calculating the difference between the expected phase angle $\theta'_i$ and the phase $\theta_i$.

3. The method as in claim 2, wherein determining the excess phase angle rotation comprises calculating $\Phi_i$ as $\theta_i - 2\theta_{i-1} + \theta_{i-2}$, wherein $\theta_{i-1}$ is the phase angle of the i-1 th datum and $\theta_{i-2}$ is the phase angle of the i-2 th datum.

4. The method as in claim 1, wherein said vector amplitude $r_i$ is proportional to an acoustic pressure amplitude of said physical medium.

5. The method as in claim 1, wherein said vector amplitude $r_i$ is proportional to the square of an acoustic pressure amplitude of said physical amplitude.

6. The method as in claim 1, wherein $F(\Phi_i)$ is defined as: $F(\Phi_i)=C+D\Phi_i^E$, and C, D, and E are preselected real numbers.

7. The method as in claim 6, wherein D is less than zero and E is greater than zero.

8. The method as in claim 6, wherein C is about 2.53, D is about −134.74, and E is about 8.

9. The method as in claim 6, wherein C is about 8, D is about −51.2, and E is about 8.

10. The method as in claim 1, further comprising the step of calculating a phase fluctuation γ as:

$$\gamma = \frac{1}{SF1}\sum_{i=3}^{N}\Gamma_i,$$

wherein SF1 is a preselected scaling factor.

11. The method as in claim 10, wherein said preselected scaling factor SF1 is N−2.

12. The method as in claim 10, further comprising calculating a process, AWSUM ESP as:

$$AWSUM\ ESP = \left[\frac{1}{SF2}\sum_{i=3}^{N}r_i^{\Gamma_i}\right]^\gamma,$$

wherein SF2 is a preselected scaling factor.

13. The method as in claim 12, wherein said preselected scaling factor SF2 is N−2.

14. The method as in claim 12, further comprising the step of determining a process, AVGPR, as:

$$AVGPR = \frac{1}{SF3}\sum_{i=3}^{N}r_i^K,$$

wherein K is a real number and SF3 is a preselected scaling factor.

15. The method as in claim 14, wherein said preselected scaling factor SF3 is N−2.

16. The method as in claim 14, further comprising the step of calculating a process ESP, as:

$$ESP = \frac{AVGPR}{AWSUM\ SP}.$$

17. The method as in claim 16, further comprising the step of comparing said process ESP to a threshold value.

18. The method as in claim 17, wherein said threshold value is 3.16.

19. A signal processor for processing a signal, wherein the signal is representative of a characteristic of a physical medium, said signal processor being adapted to receive a set of complex data for i=1 to N,
   wherein N=the total number of data in the set,
   each datum of the set having a vector amplitude $r_i$ and phase angle $\theta_i$, representative of a rotation rate which, if constant, yields an expected phase angle $\theta'_i$ of a ith vector equals to second phase angle, $\theta_{i-1}$ plus the difference between the first and second phase angles,
      determining $\Phi_i$, wherein $\Phi_i$ is an estimate having a predetermined value representative of a constant rotational rate of the magnitude of phase fluctuation of the ith vector, and calculating a phase fluctuation, $\Gamma_i$, wherein $\Gamma_i=F(\Phi_i)$ and $F(\Phi_i)$ and $F(\Phi_i)$ is a preselected function of $\Phi_i$.

20. The signal processor as in claim 19, wherein the predetermined value of said $\Phi_i$ equals an excessive phase rotation angle representative of a non-constant rotational rate, and wherein the step determining $\Phi_i$ comprises calculating the difference between the expected phase angle $\theta'_i$ and the phase $\theta_i$.

21. The signal processor as in claim 20, wherein determining the excess phase angle rotation comprises calculating $\Phi_i$ as $\theta i - 2\theta_{i-1} + \theta_{i-2}$, wherein $\theta_{i-1}$ is the phase angle of the i-1 th datum and $\theta_{i-2}$ is the phase angle of the i-2 th datum.

22. The signal processor as in claim 19, wherein said vector amplitude $r_i$ is proportional to an acoustic pressure amplitude of said physical medium.

23. The signal processor as in claim 19, wherein said vector amplitude $r_i$ is proportional to the square of an acoustic pressure amplitude of said physical amplitude.

24. The signal processor as in claim 19, wherein $F(\Phi_i)$ is defined as:

$F(\Phi_i) = C + D\Phi_i^E$, and C, D, and E are preselected real numbers.

25. The signal processor as in claim 24, wherein D is less than zero and E is greater than zero.

26. The signal processor as in claim 24, wherein C is about 2.53, D is about −134.74, and E is about 8.

27. The signal processor as in claim 24, wherein C is about 8, D is about −51.2, and E is about 8.

28. The signal processor as in claim 19, said signal processor being adapted to calculate a phase fluctuation $\gamma$, as:

$$\gamma = \frac{1}{SF1} \sum_{i=3}^{N} \Gamma_i,$$

wherein SF1 is a preselected scaling factor.

29. The signal processor as in claim 28, wherein said preselected scaling factor SF1 is N−2.

30. The signal processor as in claim 28, further adapted to calculating a process, AWSUM ESP as:

$$AWSUM\ ESP = \left[\frac{1}{SF2} \sum_{i=3}^{N} r_i^{\Gamma_i}\right]^\gamma,$$

wherein SF2 is a preselected scaling factor.

31. The signal processor as in claim 30, wherein said preselected scaling factor SF2 is N−2.

32. The signal processor as in claim 30, further adapted to determine a process, AVGPR, as:

$$AVGPR = \frac{1}{SF3} \sum_{i=3}^{N} r_i^K,$$

wherein K is a real number and SF3 is a preselected scaling factor.

33. The signal processor as in claim 32, wherein said preselected scaling factor SF3 is N−2.

34. The signal processor as in claim 32, further adapted to determine a process ESP, as:

$$ESP = \frac{AVGPR}{AWSUM\ SP}.$$

35. The signal processor in claim 34, further adapted to compare said process ESP to a threshold value.

36. A signal processor as in claim 35, wherein said threshold value is about 3.16.

* * * * *